(12) United States Patent
Halliar et al.

(10) Patent No.: US 6,904,698 B2
(45) Date of Patent: Jun. 14, 2005

(54) APPARATUS FOR MEASURING PISTON TRAVEL

(75) Inventors: William R. Halliar, Whiting, IN (US); Stuart F. Trout, Frankfort, IL (US); Bruce E. Keating, Aurora, IL (US)

(73) Assignee: TTX Company, Chicago, IL (US)

( * ) Notice: Subject to any disclaimer, the term of this patent is extended or adjusted under 35 U.S.C. 154(b) by 0 days.

(21) Appl. No.: 10/431,328

(22) Filed: May 7, 2003

(65) Prior Publication Data

US 2004/0205977 A1 Oct. 21, 2004

Related U.S. Application Data

(60) Provisional application No. 60/463,920, filed on Apr. 18, 2003.

(51) Int. Cl.$^7$ ................................................ G01B 3/00
(52) U.S. Cl. ............................ 33/833; 33/613; 33/609; 116/208; 188/1.11 W
(58) Field of Search ................................ 116/208, 281, 116/283; 188/1.11 W, 1.11 R; 33/833, 609, 613, 645, 501.45, 600, 605–606

(56) References Cited

U.S. PATENT DOCUMENTS

| | | | | |
|---|---|---|---|---|
| 444,077 A | * | 1/1891 | Thompson et al. | ......... 116/283 |
| 3,298,466 A | | 1/1967 | Ayers et al. | |
| 3,438,351 A | | 4/1969 | Kirkwood | |
| 3,922,999 A | | 12/1975 | Meginnis | |
| 4,279,214 A | | 7/1981 | Thorn | |
| 4,452,349 A | | 6/1984 | Tscheplak | |
| 4,757,300 A | * | 7/1988 | Sebalos | ....................... 340/454 |
| 4,989,537 A | | 2/1991 | Hutchinson, Sr. et al. | |
| 4,991,310 A | | 2/1991 | Melia | |
| 5,044,302 A | | 9/1991 | Goldfein et al. | |
| 5,140,932 A | | 8/1992 | Goldfein et al. | |
| 5,178,092 A | | 1/1993 | Schedin | |
| 5,181,440 A | * | 1/1993 | Jagt | ............................ 81/484 |
| 5,213,056 A | | 5/1993 | Nicholls et al. | |
| 5,226,509 A | * | 7/1993 | Smith | .................... 188/1.11 W |
| 5,320,198 A | | 6/1994 | Hoyt et al. | |
| 5,441,128 A | | 8/1995 | Hoyt | |
| 5,492,203 A | | 2/1996 | Krampitz | |
| 5,701,974 A | | 12/1997 | Kanjo et al. | |
| 5,762,165 A | | 6/1998 | Crewson | |
| 5,913,385 A | * | 6/1999 | Thibodeau | ................... 116/208 |
| 6,059,074 A | | 5/2000 | Crewson | |
| 6,135,242 A | * | 10/2000 | Hockley | ................ 188/1.11 R |
| 6,237,723 B1 | * | 5/2001 | Salsman | ............... 188/1.11 W |

* cited by examiner

*Primary Examiner*—Diego Gutierrez
*Assistant Examiner*—Tania Courson
(74) *Attorney, Agent, or Firm*—Brinks Hofer Gilson & Lione

(57) ABSTRACT

A piston travel measuring device for mounting to a non-pressure head is provided. The non-pressure head includes a cylinder and a piston connected thereto for reciprocal movement along a piston travel axis. The device comprises a mounting flange adapted to mount to at least a portion of the cylinder, an elongated body projecting from the flange and along at least a portion of the travel axis of the piston, and at least one indicator on the body and aligned so that at least a portion of the piston may be visually compared with the indicator.

31 Claims, 10 Drawing Sheets

APPARATUS FOR MEASURING PISTON TRAVEL

CROSS REFERENCE TO RELATED APPLICATIONS

This application claims priority of U.S. Provisional application Ser. No. 60/463,920, filed Apr. 18, 2003, entitled APPARATUS FOR MEASURING PISTON TRAVEL, which application is incorporated herein in its entirety by reference.

FIELD OF THE INVENTION

This invention relates to piston braking systems. In particular, this invention relates to a brake wear indicator useful in a vehicle pneumatic braking system including a piston.

BACKGROUND OF THE INVENTION

Most large vehicles typically utilize braking systems that include air-pressure or hydraulic-actuated technologies. Such systems typically include a brake actuator which includes an air pressure cylinder that is mechanically linked to the brake by a push rod attached to a piston. This mechanical linkage exhibits travel which increases as the braking member, such as brake pad or brake lining, wears during use. In typical large vehicle applications, the actuator is visible upon inspection. It is thus common to evaluate the magnitude of brake wear by observing the degree of travel of the actuator rod relative to more stationary portions of the system or the vehicle. The degree of travel can be evaluated by comparing marks on the rod in its most retracted position within the cylinder with the length of extension of the push rod as the brake is applied. Most vehicle standardization codes provide a permissible limit to the magnitude of travel of actuator rod.

In rail car systems, in particular, it is often difficult to visually inspect the braking system by determining the degree of travel of the brake actuator push rod. Typically, such inspection requires additional equipment that must be utilized in difficult-to-reach places such as the underside of the rail car between rails. Furthermore, dirt, snow and ice accumulation underneath the rail car may prevent effective viewing of the push rod to determine accurately the proper degree of travel. This leads to the problem of inspections taking place less frequently than required, which can be a serious safety concern. Furthermore, such labor-intensive inspections require the use of valuable and sometimes expensive personnel who would be better-suited for other duties.

BRIEF SUMMARY OF THE INVENTION

The present invention solves one or more of the shortcomings above by providing a one-piece device and method configured to simplify the detection of increased piston travel. The embodiments described herein allow for a cost-effective, efficient method of viewing piston travel with a minimum of parts and obstructions. Such improvements greatly increase the safety and ease of maintenance of piston-dependent braking systems on structures such as railcars.

In one aspect of the invention, a piston travel measuring device for mounting to a non-pressure head is provided. The non-pressure head includes a cylinder and a piston connected thereto for reciprocal movement along a piston travel axis. The device comprises a mounting flange adapted to mount to at least a portion of the cylinder, an elongated body projecting from the flange and along at least a portion of the travel axis of the piston, and at least one indicator on the body and aligned so that at least a portion of the piston may be visually compared with the indicator.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
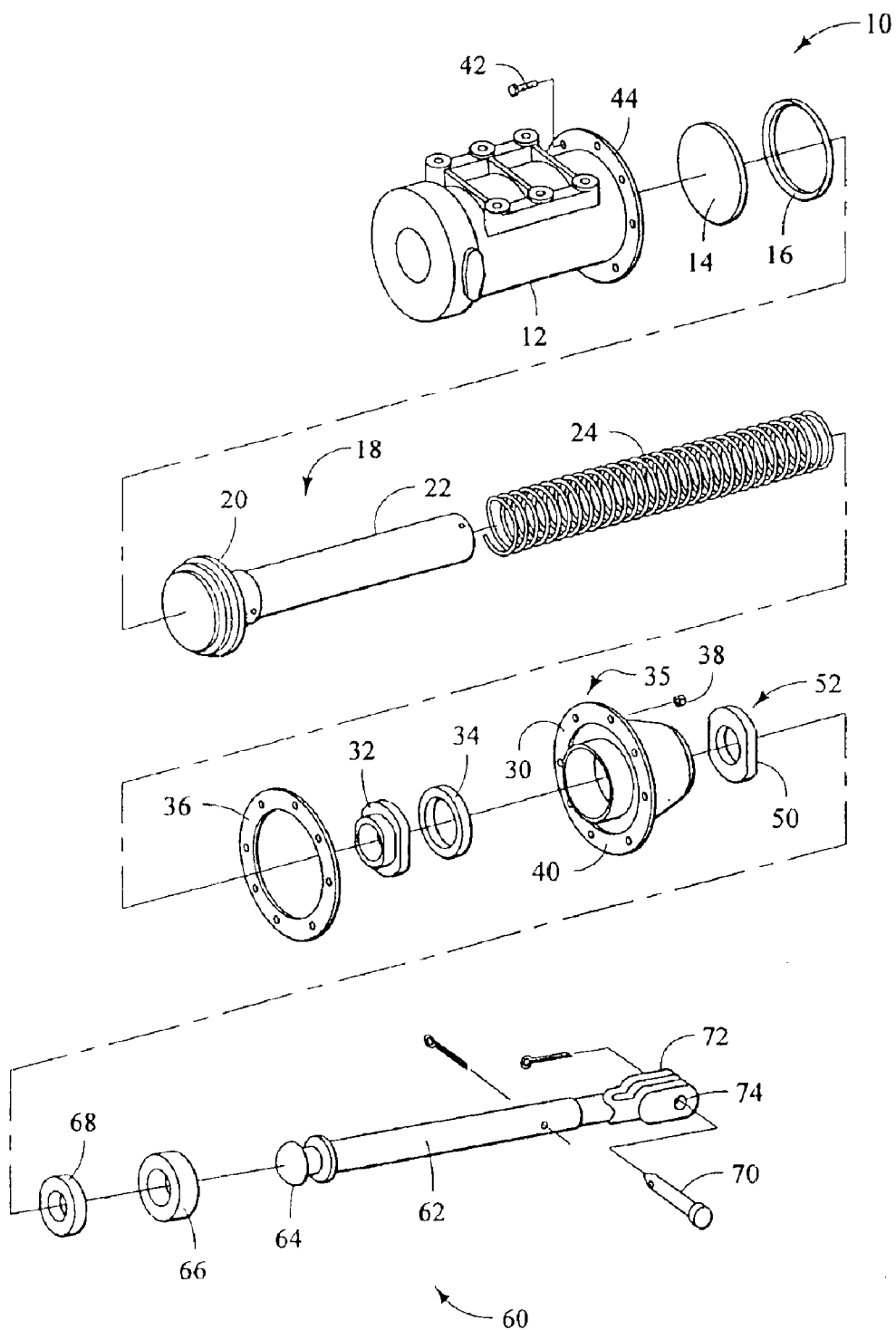
FIG. 1 is an exploded perspective view of a typical prior art pneumatic brake cylinder and push rod assembly as used in exemplary rail cars.

FIG. 1 illustrates a typical pneumatic brake cylinder and push rod assembly as used on rail cars. As illustrated therein, the assembly 10 includes a generally hollow brake cylinder 12, a round packing cup 14, and a guide ring 16 interposed and attached to the cylinder 12. A piston assembly 18 including a piston 20 and hollow piston pipe 22 are inserted into the cylinder for axial movement relative thereto. The hollow piston pipe 22 is preferably elongated and cylindrical and is surrounded within the cylinder 12 by an elongated cylindrical spring 24 as shown. The piston assembly 18 is held within the cylinder 12 by a non-pressure head assembly 30, which includes a spring seat 32, a swab assembly 34, a non-pressure head 35, and a non-pressure head gasket 36. The non-pressure head 35 is assembled to the cylinder 12 using a plurality of hex nuts 38 which surround an annular, flat flange 40 on the non-pressure head 35. The hex nuts 38 mate with hex-head screws 42 inserted through a similar mating flange 44 on the cylinder 12. A collar 50 is attached via a set screw 52 to the distal end of the hollow piston pipe 22.

In use, the cylinder assembly 10 is typically attached to a brake push rod assembly 60 as shown. The assembly 60 includes an articulated push rod 62, which includes a distal end having a universal tip 64. The distal end 64 is attached via a sponge washer 66 and push rod ring 68 to the collar 50 on the end of the hollow pipe 22. A cotter pin 70 is attached to flanged, forked end 72 of the push rod 62 via openings 74. It is via the cotter pin 70 that the braking apparatus (not shown) may be actuated in a conventional manner.

In operation, air pressure entering the cylinder 12 may modulate the piston 20 and move it forwards and backwards within the interior 12. This movement of the piston 20 in turn moves the hollow piston pipe 22 and the attached push rod 62. As noted above, the push rod 62 may in turn be attached to a conventional braking mechanism, such as brake shoe or other apparatus. When the air pressure within the cylinder 12 is relieved or withdrawn, the elongated cylindrical spring 24 biases the piston 20 and its connected hollow pipe 22 inwardly into the cylinder 12. This causes a reversal of the movement of the actuator push rod 62 and may release the brake from engagement on the vehicle.

Thus, the typical pneumatic brake system as described above, may be configured in either a brake "on" position wherein the piston pipe 22 and its attached push rod 62 are extended, or a brake "off" position with these elements retracted back into the cylinder 12. Thus, under the force of air pressure admitted within the cylinder 12, the helical coil spring 24 is compressed and the push rod 62 and piston pipe 22 are advanced to rotate a flac adjuster element (not shown) and apply the brake to the vehicle. The extent of this travel is limited by the seating of the brake member such as a brake lining or brake pad against a wheel or axle member such as disc or drum attached to the axle or wheel. The extent of travel of the push rod 62 thus provides the direct indication of the degree of wear of the brake member as well as any accumulated tolerances in the mechanical interconnection of the actuator to the brake member. This travel thus indicates the wear of the entire brake system and, for this reason, is used in vehicle code specifications on the permissible safe and unsafe condition of the brake system. In the prior art, the extent of travel of the push rod 62 is not as easily assessed.

Figure 2:
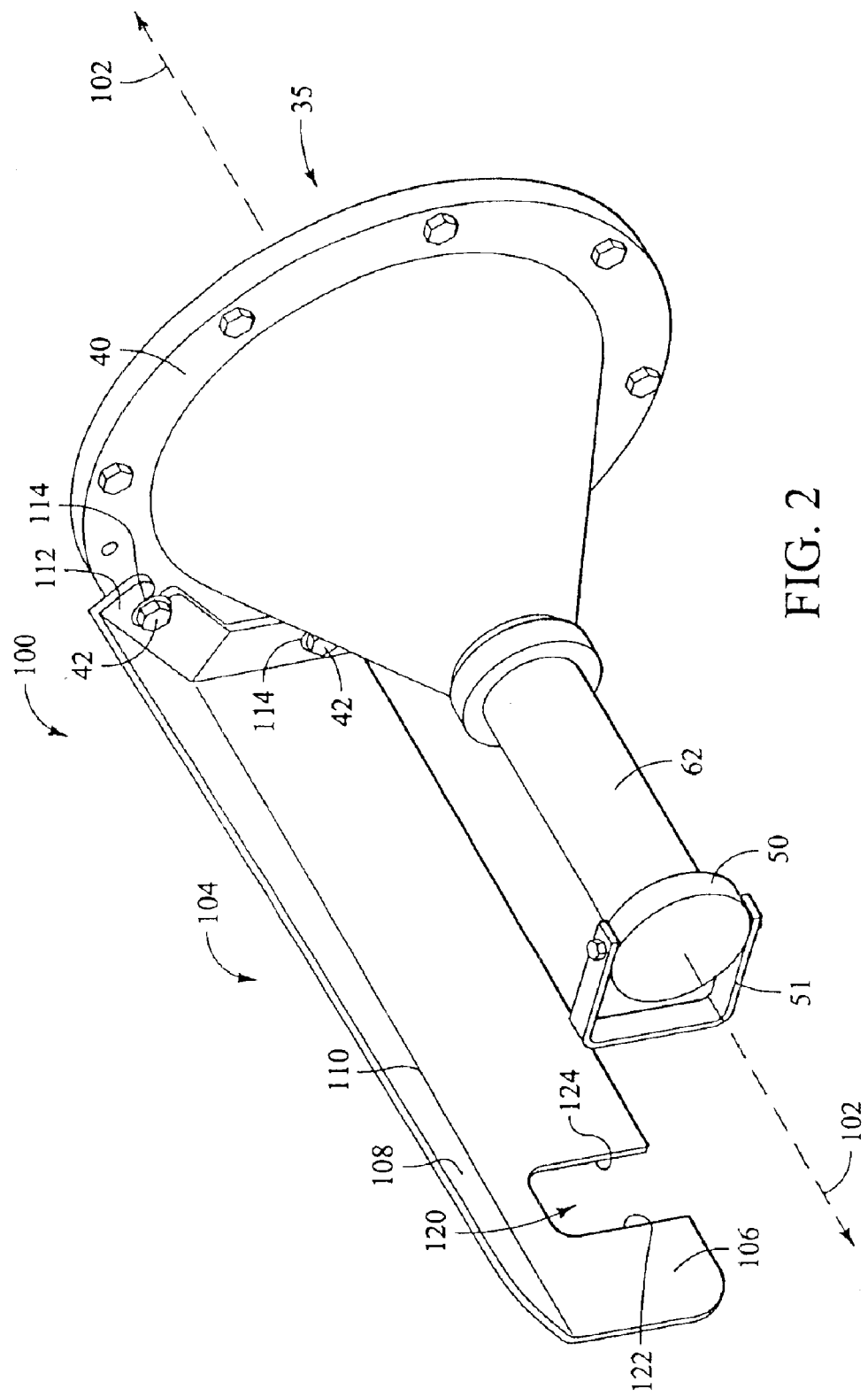
FIG. 2 is a perspective view of a first embodiment of the present invention mounted on the non-pressure head of a cylinder.
Figure 3:
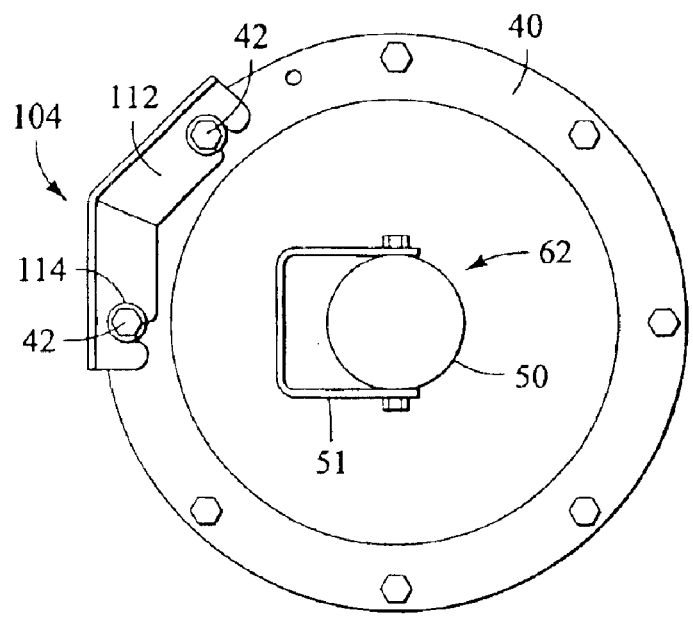
FIG. 3 is a front view of the embodiment of FIG. 2.
Figure 4:
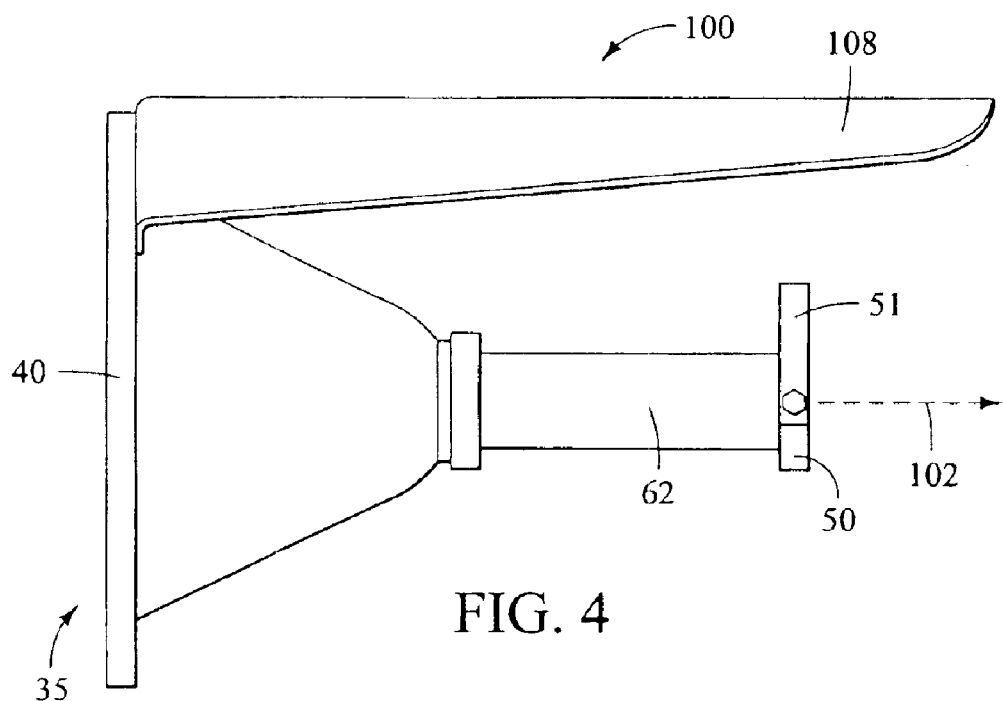
FIG. 4 is a top view of the embodiment of FIG. 2.

A perspective view of a first embodiment of the piston travel measuring device in accordance with the present invention is shown in FIG. 2. Planar side views of this embodiment are also shown in FIGS. 3–6. As shown in the figures, the device 100 is shown attached to the annular flange 40 of the non-pressure head 35. The device 100 extends along the piston travel axis 102 and extends in the direction away from the base of the flange 40 and toward the push rod 62. In general, the device 100 is defined by a single-piece, elongated body 104 including an elongated wall. The wall may be subdivided into at least a first wall 106 and a second wall 108. The walls 106, 108 are joined along a fold or weld 110 as shown. The base of the elongated body 104 forms a generally flat mounting flange 112 and includes a plurality of open-sided apertures 114 to allow the mounting of the flange 112 and the device 100 to the flange 40 of the non-pressure head 35. As shown, the mounting flange 112 may be held to the flange 40 of the non-pressure head 35 through the use of the hex-head screws 42 which are the same screws that secure the non-pressure head 35 to the pneumatic cylinder 12.

Preferably, the device 100 is formed from a single, relatively stiff piece of material such as plastic, corrugated plastic, sheet aluminum, stainless steel, composite fiber, or other suitable and well-wearing materials. Preferably, the material is able to withstand significant vibrational effects and temperature variations, in addition to being resistant to corrosion. In the preferred embodiment, the device 100 is formed from ⅛ inch thick stainless steel sheeting stamped into the form of the preferred embodiments.

In the preferred embodiment, a travel indicator window 120 is defined in the first wall 106 near a distal end of the body 104. The window 120 includes a first edge 122 and a second edge 124 which are used to delineate the preferred extends of travel for the piston or push rod 62. The window 120 is wide enough and elongated enough so that the end portion of the push rod 62, which may typically include either a collar 50 or an attachment bracket 51, that is easily viewable when looking through the window 120 from a significant distance away. In most cases, when utilized on a rail car, the window should be viewable along with the piston from a side of the car.

Figure 6:
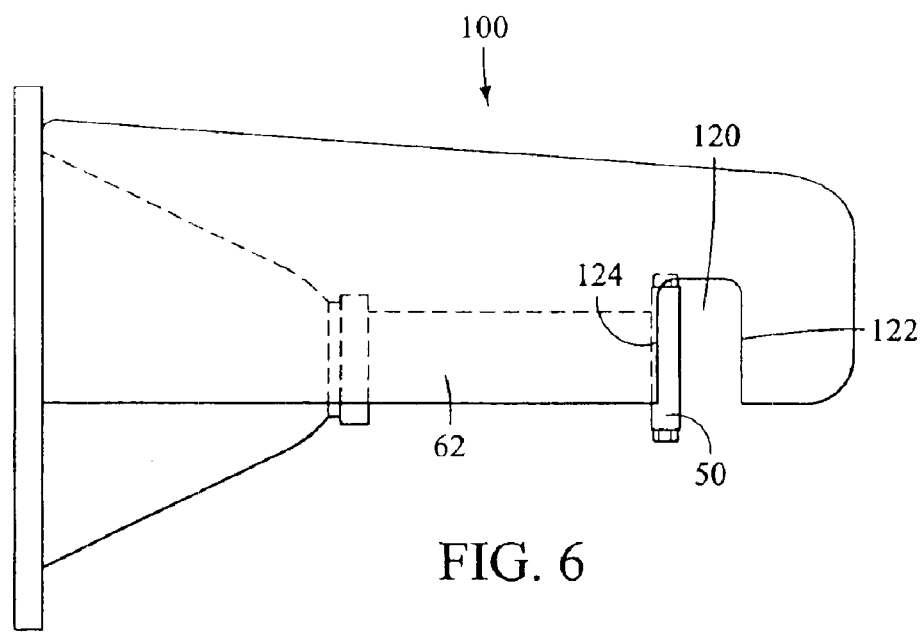
FIG. 6 is a right side view of the embodiment of FIG. 2.

FIG. 6 shows a side elevational view of the device 100 and the push rod 62 in a "brake off" for retracted position. As shown, the distal end and collar 50 are visible to be adjacent to the second edge 124 defined in a window 120. When the push rod 62 is placed in a "brake on" position where the push rod 62 is fully extended, the collar 50 at the distal end of the push rod 62 extends to the first edge 122 of the window 120.

Figure 5:
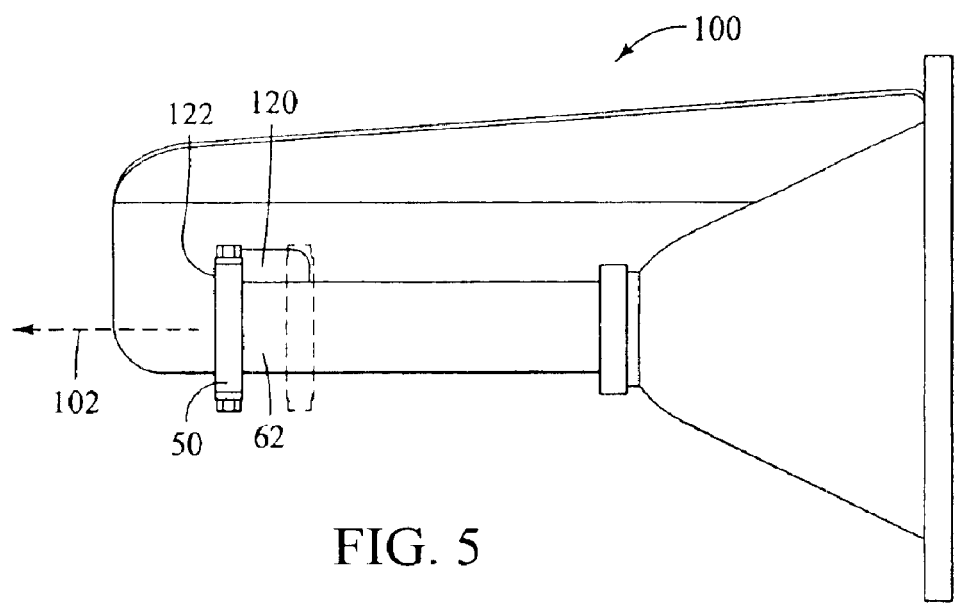
FIG. 5 is a left side view of the embodiment of FIG. 2, showing various extensions of the piston.

Upon full brake on and full brake off positions, the extent of piston travel is similar to that shown in FIGS. 5 and 6, respectively, the window 120 may be sized so that such extents of piston travel relate to proper braking tolerance. If the braking apparatus is exhibiting too much wear, then the actuation of the braking system to the "brake on" position may show that the distal end and collar 50 of the push rod 52 extends past the first edge 122 of the window 120 and thus becomes non-visible through the window 120 when viewed as shown in FIG. 5 or 6. When such positioning is observed, it may be determined to be desirable to replace the braking apparatus for safety and economic reasons.

Preferably, the body 104 is shaped with the fold 110 or some curvature to add stiffness to the structure of the body 104 so that it does not bend under wind, vibration, debris, or other forces. Preferably, the body 104 is shaped or oriented to have a generally open configuration so that debris and snow or ice cannot accumulate readily on the surface of the body 104.

Of course, various standards may be established by the relative dimensions of the window 120 relative to the piston or push rods so that excessive brake wear may be determined or shown by various relative alignments. For example, the window 120 may be aligned or sized relative to the end of the push rod 62 so that upon alignment of the collar 50 with the first wall 122, excessive wear may be shown to exist at that instant. Or, in the alternative, the piston end 50 may be completely concealed behind the first wall 106 and only revealed through the window 120 upon the existence of excessive wear in the brake actuator. Of course, various instructions would have to be provided to the inspectors so that proper extent of the braking indicator is properly understood across all car types and inspectors.

Figure 7:
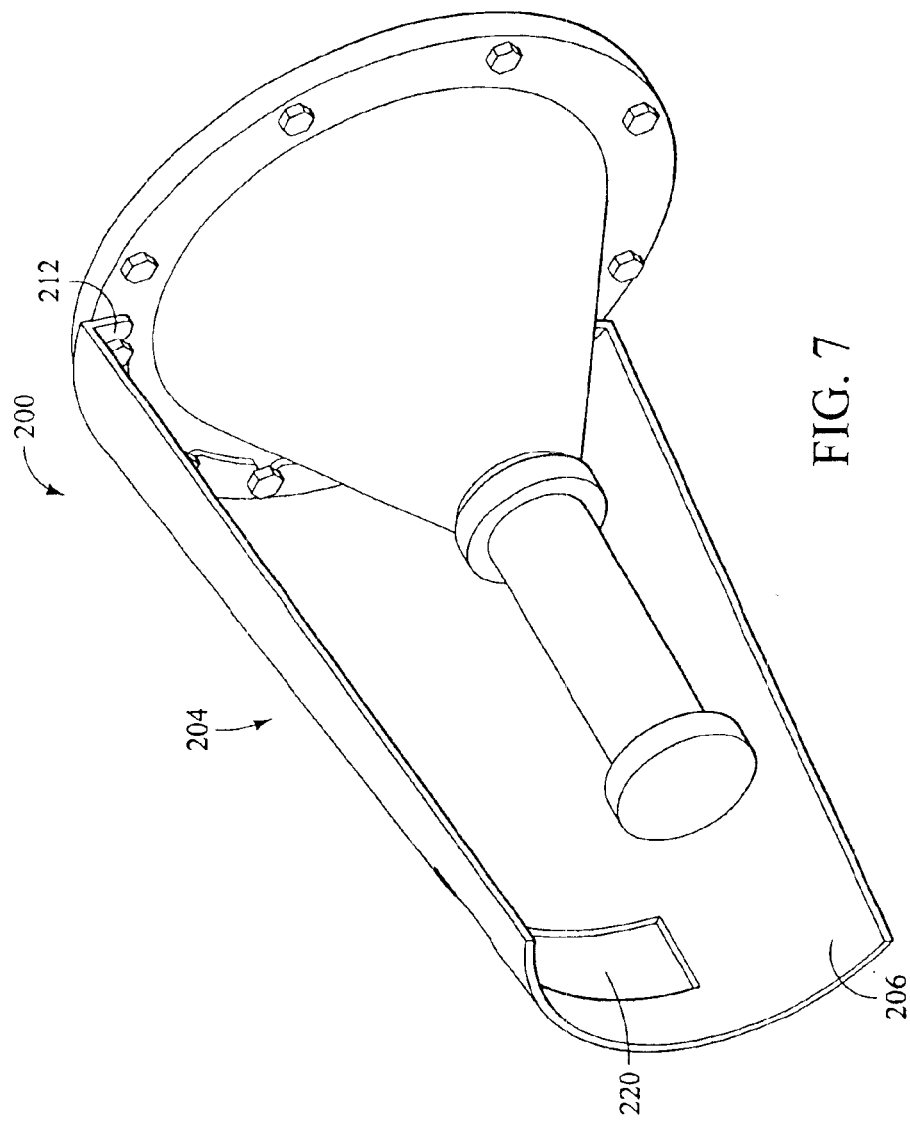
FIG. 7 is a perspective view of a second embodiment of the present invention mounted on the non-pressure head of a cylinder.
Figure 8:
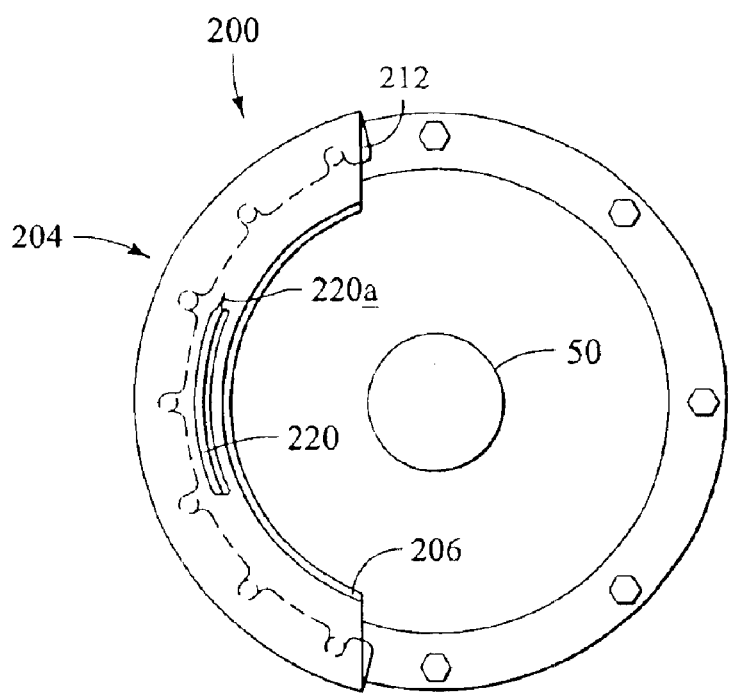
FIG. 8 is a front view of the embodiment of FIG. 7.
Figure 9:
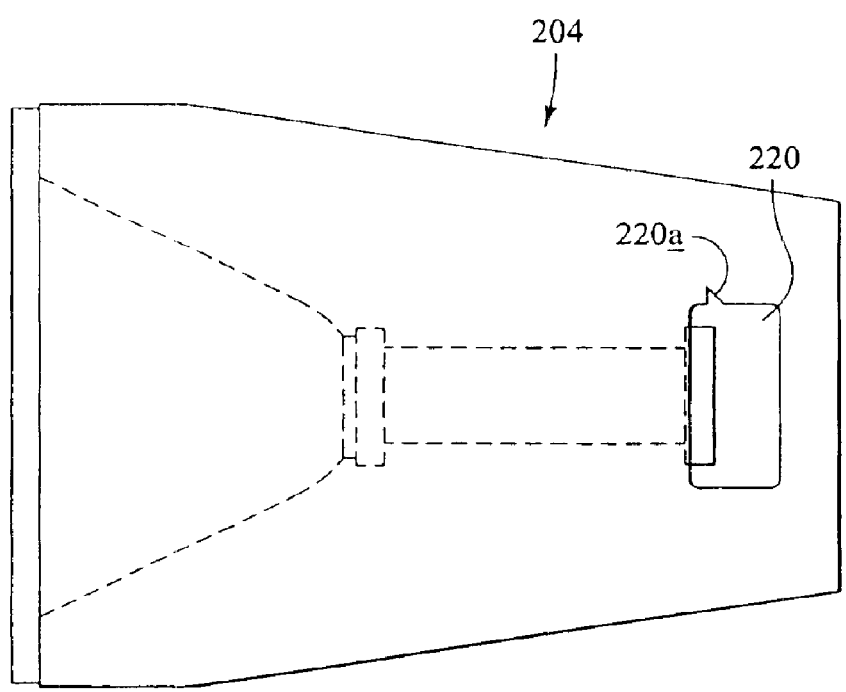
FIG. 9 is a right side view of the embodiment of FIG. 7.

Thus, alternative shapes of the body 104 may be utilized effectively. For example, FIGS. 7–9 illustrate a frustoconical section body 204 that includes a more substantial curved wall 206. The particular shape of the second embodiment is likely structurally stronger than the embodiment shown in FIG. 1, and may be necessary for particular types of rail cars or rail cars that run on particularly weather-prone routes or routes that subject equipment to excessive wear. As shown, a similar mounting structure may be utilized via a mounting flange 212. It is important to note that the mounting structure of the mounting flange on all of the embodiments disclosed herein may be adaptable for mounting on a variety of non-pressure head configurations. For example, in FIG. 8, the arrangement of multiple bolt-mounting apertures 214 on the mounting flange 212 may be allocated to allow for variations in bolt distribution around the head. In this embodiment, there are seven mounting apertures 214 distributed around the flange 212, and three of the apertures 214 are utilized by appropriately spaced mounting bolts 238 to sufficiently mount the flange 212. This allows the flange 212 to be mounted in other positions on the non-pressure head in smaller increments, and allows it to be mounted on different non-pressure head models.

The window 220 may be formed in the wall 206 as a rectangle or other shaped opening, and a pointing cutout 220a may be used to more precisely indicate the piston wear position.

Note that the shapes of all of the embodiments allow snow and other debris to roll off the body of the device and to prevent excessive accumulation of such debris. Furthermore, drainage holes may be provided on an underside of the device, or the device may be mounted, as shown, wherein the interior of the curved wall of the body may be directed in a downwardly direction to prevent accumulation of snow and other debris. Note also that all of the devices illustrated herein may, instead of the windows defined in the body, utilize markings on the devices that may be used to measure the travel of the piston. However, in these embodiments, it is preferred that a simple window be used because such is more easily viewable from the side of a real without needing to approach the underside of the car and view the brake indicator and any indicia more closely.

Figure 10:
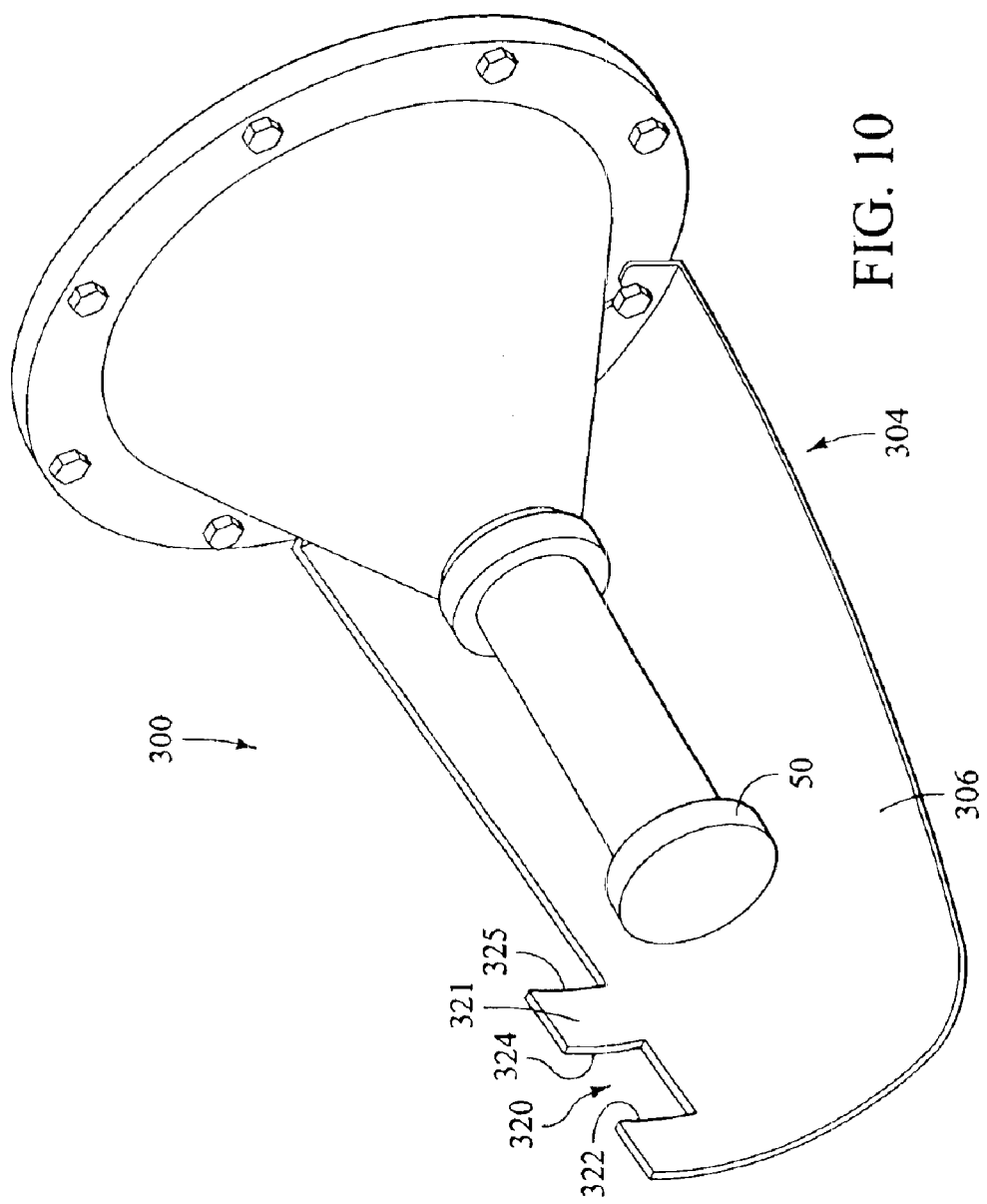
FIG. 10 is a perspective view of a third embodiment of the present invention mounted on the non-pressure head of a cylinder.
Figure 11:
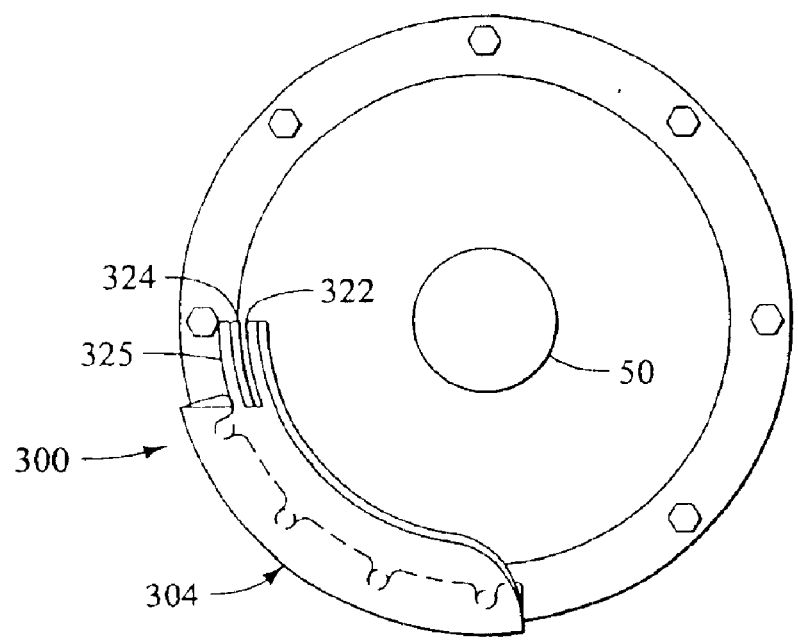
FIG. 11 is a front view of the embodiment of FIG. 10.
Figure 12:
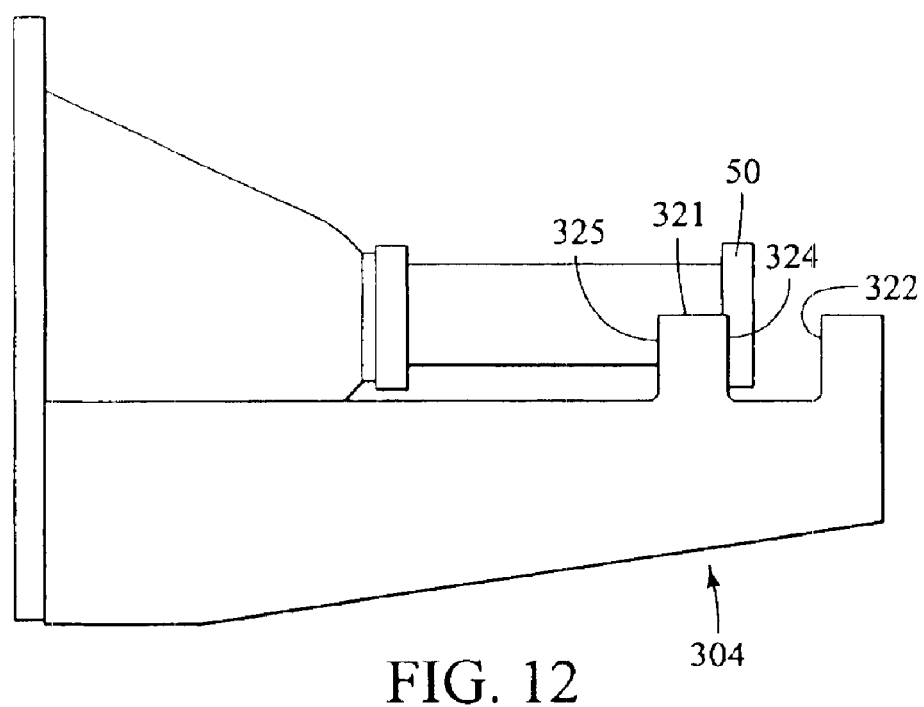
FIG. 12 is a right side view of the embodiment of FIG. 10.

A third embodiment is shown in FIGS. 10–12. In these views, another conical section is provided of smaller arc length. A generally curved wall 306 of the body and a truncated window 320 therein are provided. Note that in this embodiment, the window 320 defines the pair of edges 322 and 324 that may be useful in determining the travel of the piston distal end 50. However, in this embodiment, the additional piece of outstanding material 321 may be used to define a third edge 325 that may be useful for showing excessive brake wear along another parameter or other variations in tolerance.

Figure 13:
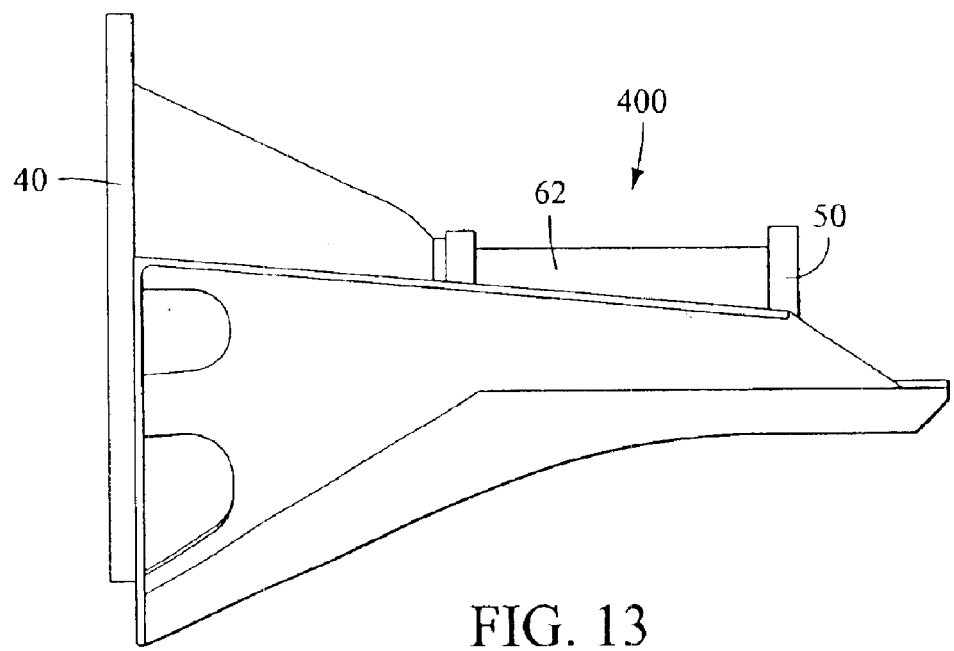
FIG. 13 is a top view of a fourth embodiment of the present invention mounted on the non-pressure head of a cylinder.
Figure 14:
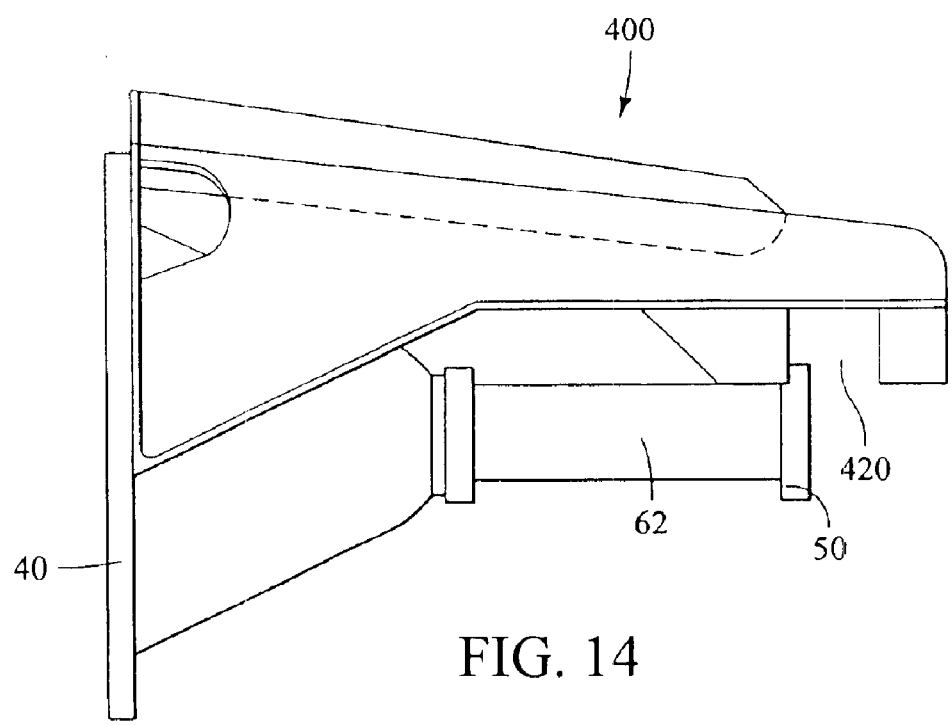
FIG. 14 is a right side view of the embodiment of FIG. 13.
Figure 15:
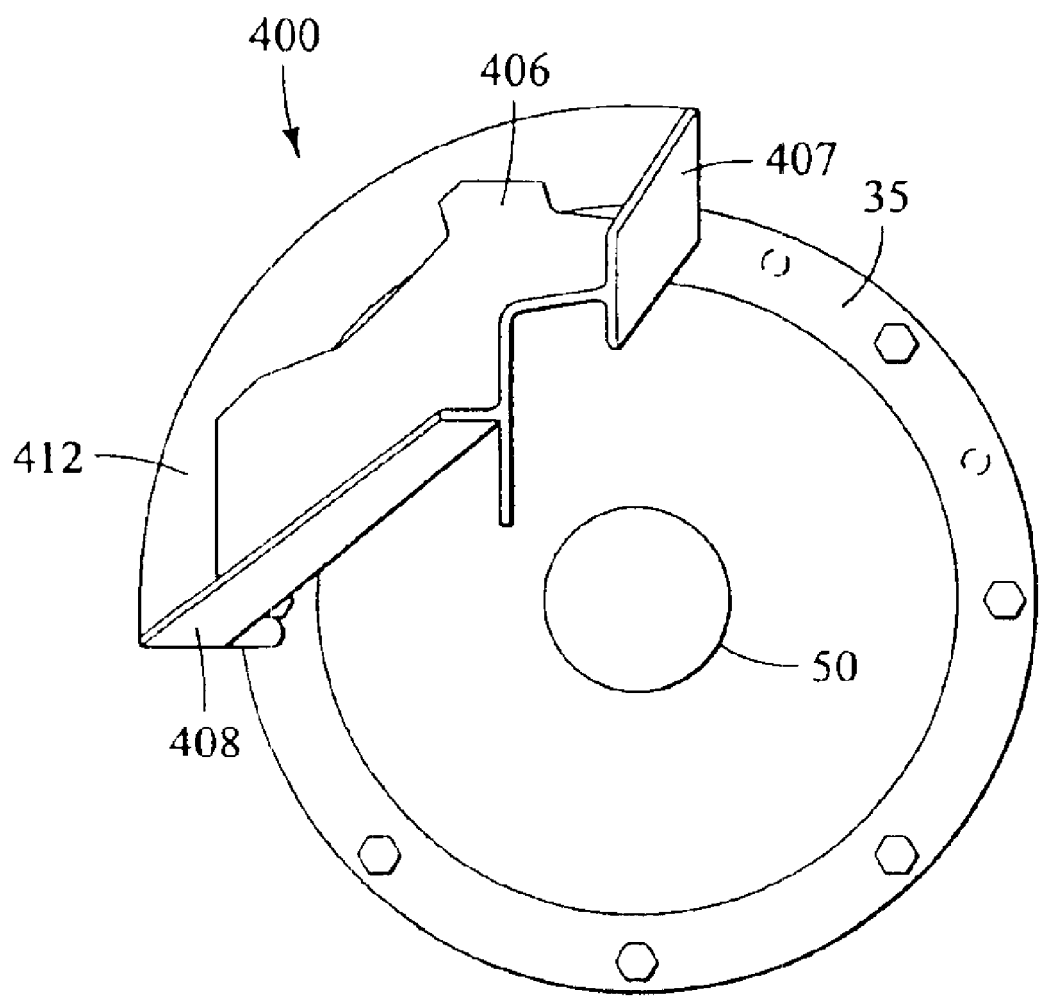
FIG. 15 is a front view of the embodiment of FIG. 13.

FIGS. 13–15 illustrate a fourth embodiment 400 of the piston travel indicator in accordance with the present invention. In this embodiment, various structural flanges are provided to further strengthen the durability of the device. In particular, a contour wall 406 is provided having an angled and curved configuration. The elongated edges of the wall 406 define generally flat, segmented walls, such as walls 407 and 408 which extend along most of the length of wall 406 to provide more structural rigidity. The flat mounting flange 412 for mounting to the cylinder low-pressure head is also provided. As shown in FIG. 14, a window 420 may also be provided as shown. Along the mounting flange, a plurality of large drainage holes 430 may be provided to assist in drainage and to prevent accumulation of debris.

In operation, the device, such as the device 100 shown in FIGS. 2–6, is properly mounted to the low-pressure head 35 of the schematic assembly 10. Preferably, as noted above, the device 100 is mounted so that the travel of the push rod 62 is easily readable relative to the window 120 defined in the body 104 of the device 100. Next, an inspector actuates the braking system of the rail car so that the push rod 62 is extended and the brake is placed in a "brake on" position. From the side of the rail car, the inspector need only view this full extension of the push rod 62 from the side of the vehicle relative to the indicator window 120. If from this reading it is determined that the brake is extended too far relative to the window 120, then it may be determined that the braking device may need maintenance, If the reading shows that there is not excessive wear and that the brake is within proper tolerance, then the inspector may determine that no maintenance is required. The inspector may also release the brake and place it into a "brake off" position where the push rod 62 is in a fully retracted position. At this point, the inspector may choose to also measure the extent of the push rod 62 relative to the window 120 to determine whether any wear exist in such a position.

As noted above, instead of the windows shown in the above embodiments, various indicia or numerals may be found to be useful in registering the degree of travel of the push rod 62. The indicia can comprise a series of numerals in calibrated progression relative to the travel of the push rod, or, optionally, can comprise a collar code progressing in various degrees relative to the positioning of the push rod in various wear parameters.

While preferred embodiments of the invention have been described, it should be understood that the invention is not so limited and modifications may be made without departing from the invention. The scope of the invention is defined by the appended claims, and all devices that come within the meaning of the claims, either literally or by equivalents, are intended to be embraced therein.

What is claimed is:

1. A piston travel measuring device for mounting to a non-pressure head, said non-pressure head having a cylinder and a piston mounted thereto for reciprocal movement along a piston travel axis, said device comprising:
    a mounting flange adapted to mount to at least a portion of said cylinder;
    an elongated body projecting from said flange and along at least a portion of said travel axis of said piston; and
    at least one indicator unitarily formed on said body and aligned so that at least a portion of said piston may be visually compared with said indicator.

2. The device of claim 1 wherein said body further comprises at least one wall.

3. The device of claim 2 wherein said at least one wall is integral with said mounting flange.

4. The device of claim 3 wherein said at least one wall is curved.

5. The device of claim 2 wherein said indicator further comprises at least one opening defined in said at least one wall of said body.

6. The device of claim 5 wherein said indicator further comprises at least a partial window defined in said at least one wall.

7. The device of claim 5 wherein said indicator further comprises a full window defined in said at least one wall.

8. The device of claim 5 wherein said mounting flange further comprises a partial annular shape for mounting to said cylinder.

9. The device of claim 8 wherein said mounting flange is mounted to said cylinder via a plurality of bolts.

10. The device of claim 9 further comprising wrench access areas defined on said mounting flange for allowing access by a wrench to said bolts.

11. The device of claim 1 wherein a distal end of said piston may be visually compared with said indicator a distance from said cylinder.

12. The device of claim 1 wherein said body is oriented to allow drainage of water.

13. The device of claim 12 wherein said body is tapered along its longest dimension to assist in said drainage.

14. The device of claim 13 further comprising at least one drainage opening defined in said body.

15. The device of claim 12 wherein said body is mounted so that a portion of said body facing said piston is oriented vertically above said cylinder to prevent accumulation of water.

16. A device for measuring the travel of a piston extendable from a non-pressure head, said device comprising:

a one-piece body attached to said non-pressure head and extending along the length of said piston; and an indicator unitarily formed on said body, said indicator positioned to allow comparison between said indicator and the position of an end of said piston.

17. The device of claim 16 wherein said body further comprises a wall.

18. The device of claim 17 wherein said wall is integral with said mounting flange.

19. The device of claim 18 wherein said wall is curved.

20. The device of claim 16 wherein said indicator further comprises at least one opening defined in a wall of said body.

21. The device of claim 17 wherein said indicator further comprises at least a partial window defined in said wall.

22. The device of claim 17 wherein said indicator further comprises a full window defined in said wall.

23. The device of claim 17 wherein said mounting flange further comprises a partial annular shape for mounting to said cylinder.

24. The device of claim 21 wherein said mounting flange is mounted to said cylinder via a plurality of bolts.

25. The device of claim 24 further comprising wrench access areas defined on said mounting flange for allowing access by a wrench to said bolts.

26. The device of claim 16 wherein a distal end of said piston may be visually compared with said indicator a distance from said cylinder.

27. The device of claim 16 wherein said body is oriented to allow drainage of water.

28. The device of claim 27 wherein said body is tapered along its longest dimension to assist in said drainage.

29. The device of claim 16 further comprising at least one drainage opening defined in said body.

30. The device of claim 16 wherein said body is mounted so that a portion of said body facing said piston is oriented vertically above said cylinder to prevent accumulation of water.

31. A method for measuring the travel of a piston extendable from a non-pressure head, said method comprising the steps of:

providing a one-piece body attached to said non-pressure head and extending away from said non-pressure head along said piston, said one-piece body having an indicator unitarily formed thereon;

viewing a distal end of said piston along said indicator to provide a comparison between said distal end and said indicator; and determining the acceptable range of travel of said piston based on said comparison.

* * * * *